June 9, 1959  J. H. GRUVER  2,889,984
CARD EJECTOR FOR CARD-CONTROLLED PRINTING MACHINES
Filed June 27, 1957  5 Sheets-Sheet 1
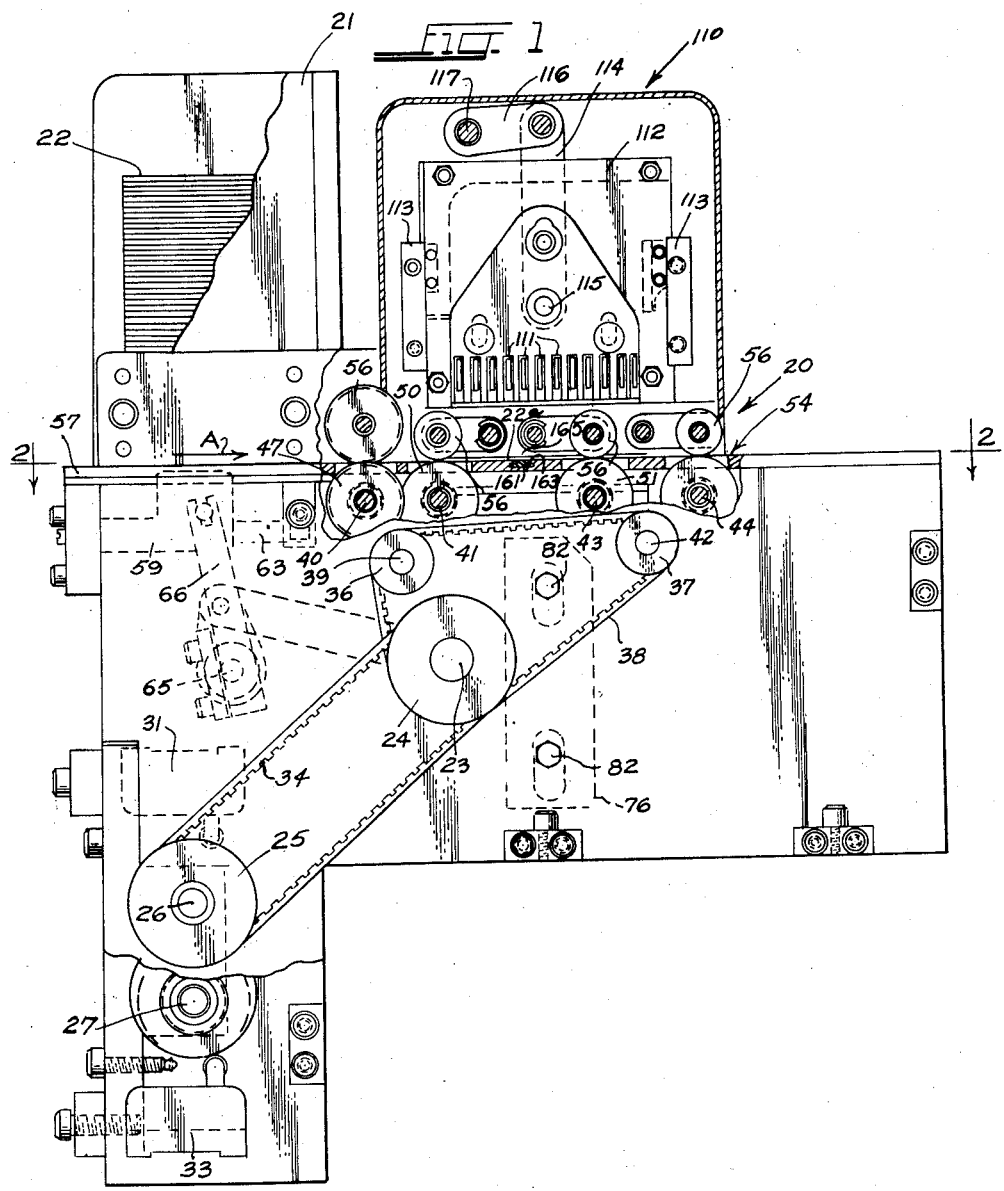
INVENTOR.
JOHN H. GRUVER
BY
Wallace and Cannon
Att'ys.

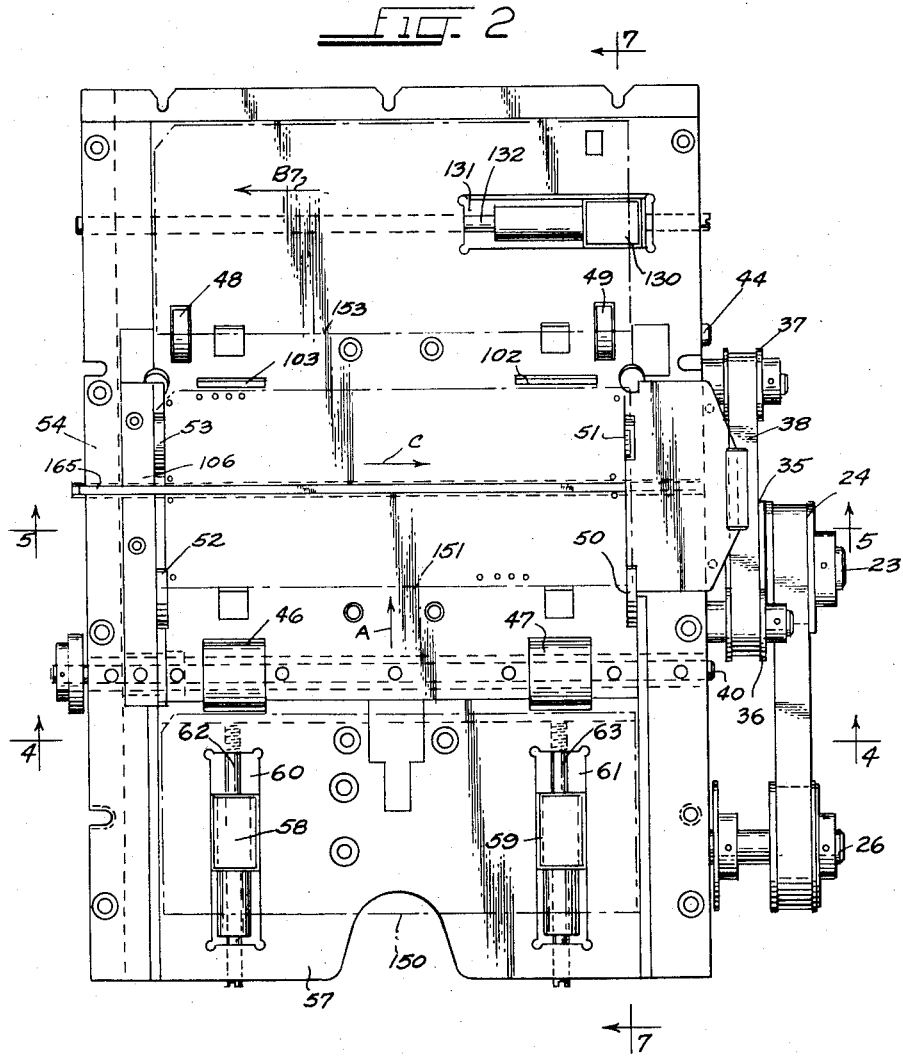

June 9, 1959  J. H. GRUVER  2,889,984
CARD EJECTOR FOR CARD-CONTROLLED PRINTING MACHINES
Filed June 27, 1957  5 Sheets-Sheet 3
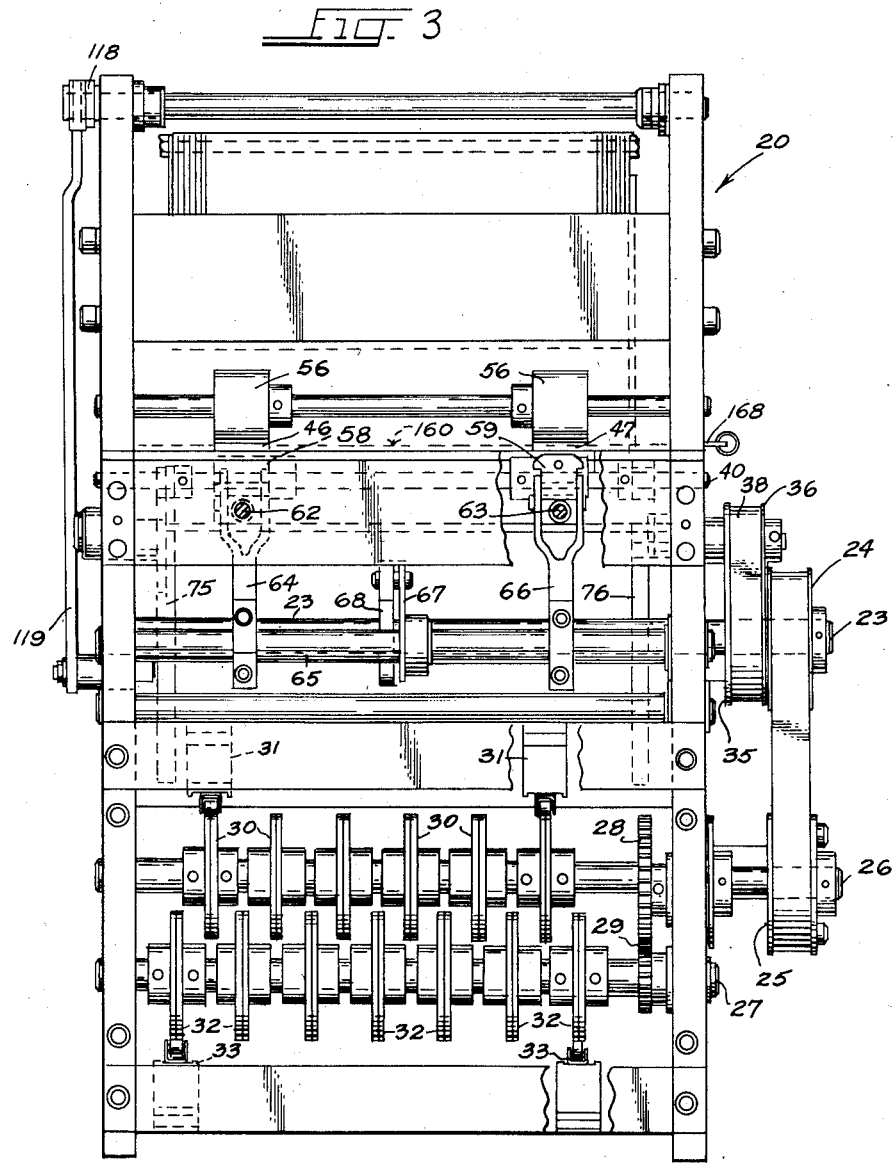
INVENTOR.
JOHN H. GRUVER
BY June 9, 1959     J. H. GRUVER     2,889,984
CARD EJECTOR FOR CARD-CONTROLLED PRINTING MACHINES
Filed June 27, 1957     5 Sheets-Sheet 4
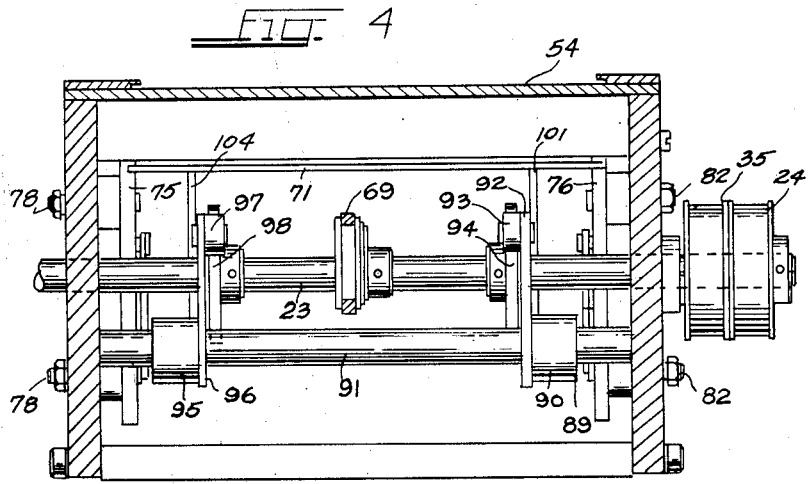
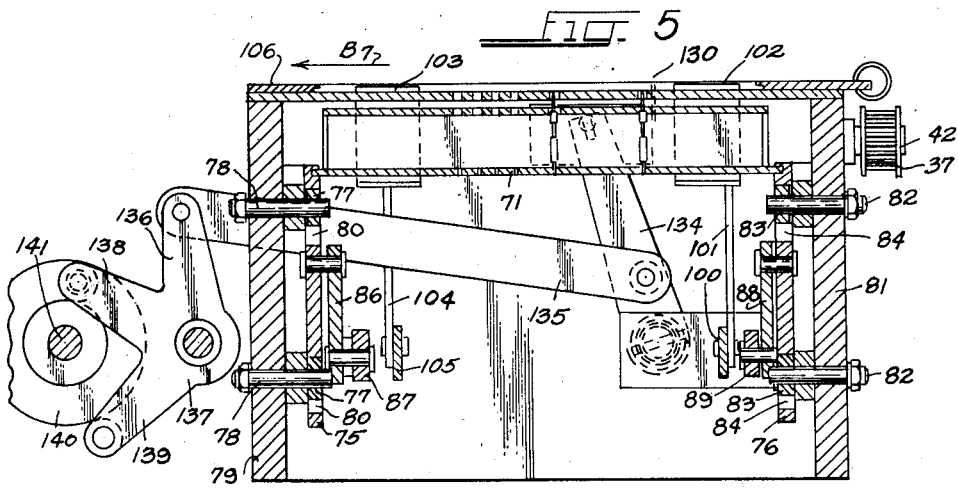
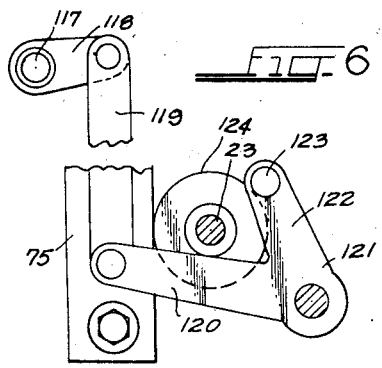
INVENTOR.
JOHN H. GRUVER
BY
Wallace and Cannon
Attys.

June 9, 1959  J. H. GRUVER  2,889,984
CARD EJECTOR FOR CARD-CONTROLLED PRINTING MACHINES
Filed June 27, 1957  5 Sheets-Sheet 5
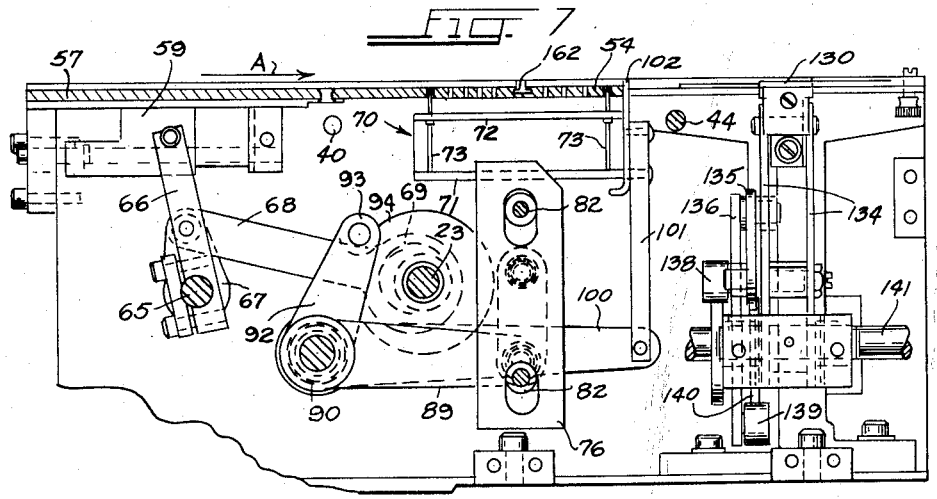
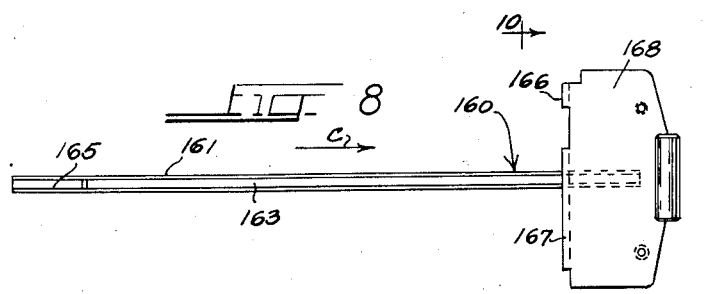
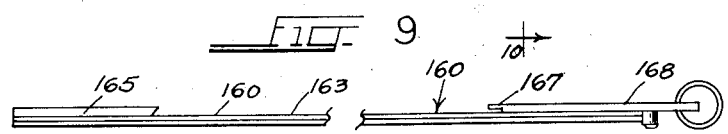
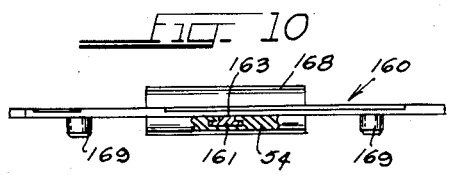
INVENTOR.
JOHN H. GRUVER
BY
*Wallace and Cannon*
Att'ys.

United States Patent Office 2,889,984
Patented June 9, 1959

2,889,984

CARD EJECTOR FOR CARD-CONTROLLED PRINTING MACHINES

John H. Gruver, Cleveland Heights, Ohio, assignor to Addressograph-Multigraph Corporation, Cleveland, Ohio, a corporation of Delaware Application June 27, 1957, Serial No. 668,538

4 Claims. (Cl. 235—61.11)

This invention relates to business machines and particularly to a new and improved business machine sensing station suitable for use in printing machines, accounting machines, and other record-card-controlled apparatus.

Many different forms of business machines are controlled in their operations by means of individual record instruments. These record instruments are usually in the form of thin, relatively flexible paper cards having a plurality of apertures punched therein in accordance with a predetermined data code to convey information relating to a given business transaction. For example, the record instruments may be employed to control a printing machine for printing address labels to be utilized in magazine subscription fulfillment, in the mailing out of insurance premiums, or in other similar applications. In an application of this kind, the cards are usually punched with data relating to the magazine subscribed to, the length of the subscription, the date of termination of the subscription, and other similar information. In many instances, a single record instrument may be encoded with information relating to two or more different magazines or insurance policies. In other instances, the record cards may be utilized in accounting work to maintain a series of financial accounts. Card-controlled business machines are also employed in other applications such as classification of scientific data and other activities of diverse nature.

Business machines of the kind described hereinabove are controlled by one or more sensing stations which analyze the information represented by the apertures in the cards. A sensing station of this kind may, for example, be utilized to determine which cards in a group of record instruments are to be employed in printing a given address list. In the course of the same operation, the sensing station and associated apparatus may determine that certain other cards are not to be utilized in the printing operation but are to be retained in the card collection; the sensing station may also be employed to remove some of the cards entirely from the card file. A printing machine of this kind is described and claimed in the co-pending application of John H. Gruver for Printing Machines, filed October 29, 1954, S. N. 465,612, now Patent No. 2,853,356. In other applications, the sensing station of the business machine may be employed to classify the cards in accordance with credit data, amounts of merchandise purchased, or other information, depending upon the kind of business function performed by the machine and the particular operation in which it is engaged.

In most instances, analysis of the data on the cards is acomplished by means of a plurality of electrical sensing elements which extend through the apertures in the cards to close or open a series of electrical control circuits incorporated in the business machine. This operation requires that the card be accurately positioned in the sensing station, since otherwise the necessary correlation between the sensing elements and the aperture positions on the record instruments cannot be maintained. Accordingly, it is necessary to afford guide means in the sensing station which are effective to maintain a record card in predetermined position at all times during the sensing cycle. The guide means usually comprises a plurality of elements which engage at least three sides of the record card, during the sensing operation, to hold it in fixed position relative to the sensing elements of the sensing station.

Not infrequently, the sensing of a given record card indicates that that particular card should be removed from the business machine and should not be permitted to continue through the machine to control susbequent operations thereof. Usually, the machine is provided with control means actuated by the sensing station for interrupting the machine operation upon the sensing of such a card in the sensing station. Conventionally constructed sensing stations, and particularly the guide means employed therein, have not permitted direct removal of the record card from the sensing station. Instead of being able to remove the defective or otherwise undesirable card from the machine directly from the sensing station, it has been necessary for the machine operator to actuate the conveyor apparatus associated with the sensing station to transfer the record card to another part of the machine before the card can be removed. This is a time-consuming operation and, in some instances, materially reduces the overall efficiency of the machine operation.

A principal object of the invention, therefore, is the provision of a new and improved sensing station for a business machine of the kind controlled by record cards or similar business instruments.

A more specific object of the invention is a new and improved business machine sensing station including an effective and convenient means for removing a business instrument directly therefrom.

Another object of the invention is a new and improved sensing station for use with punched-hole business instruments in which a card ejector is combined with and comprises a part of the guide means employed to position business instruments in the sensing station during the sensing operation.

A corollary object of the invention is a new and improved sensing station ejector structure which is simple and economical in construction and which may be incorporated in conventional sensing station apparatus with only minor modifications therein.

Thus, the invention relates to a sensing station for a business machine of the kind controlled by business instruments encoded with business information in accordance with a predetermined data code. A sensing station constructed in accordance with the invention comprises a sensing platform and means for sequentially feeding the business instruments across that platform in a given direction. Guide means are provided to maintain the business instruments in a predetermined sensing position on the platform and a plurality of sensing elements are utilized to analyze each business instrument when located in the aforementioned sensing position. In addition, the sensing station includes ejector means comprising an ejector slide which extends across the platform transversely of the direction of business instrument feed. This slide, which is utilized to remove undesired cards directly from the sensing station, is preferably mounted in substantially co-planar relation with the platform, and is moved longitudinally to effect the desired ejection operation.

Other and further objects of the present invention will be apparent from the following description and claims and are illustrated in the accompanying drawings which, by way of illustration, show a preferred embodiment of the present invention and the principles thereof and what is now considered to be the best mode for applying those principles. Other embodiments of the invention embodying the same or equivalent principles may be used and structural changes may be made as desired by those skilled in the art without departing from the present invention and the purview of the appended claims.

In the drawings:

Fig. 1 is a side elevation, partly broken away, of a sensing station constructed in accordance with a preferred embodiment of the invention;

Fig. 2 is a plan view of the sensing platform of the sensing station of Fig. 1, taken along line 2—2 therein;

Fig. 3 is a rear elevation of the sensing station, portions thereof having been broken away to illustrate certain of the operating parts;

Fig. 4 is a sectional view of the sensing station taken along line 4—4 in Fig. 2;

Fig. 5 is a further sectional view taken along line 5—5 in Fig. 2;

Fig. 6 is a detail view illustrating a part of the sensing station drive apparatus;

Fig. 7 is a longitudinal section view of the sensing station taken along line 7—7 in Fig. 2;

Fig. 8 is a detail plan view showing the ejector slide employed in the sensing station;

Fig. 9 is an enlarged side elevation view of the ejector slide; and

Fig. 10 is an enlarged sectional view of the slide taken along line 10—10 in Fig. 8.

The business machine sensing station 20 illustrated in Figs. 1–7 includes a card magazine 21 in which a plurality of record cards or other business instruments 22 are stacked to be fed into the sensing position of the sensing station. Sensing station 20 includes a main drive shaft 23 which extends transversely of the sensing station and which constitutes the principal drive element in the sensing station apparatus. The main drive shaft 23 is cyclically driven in a manner well known in the art, the drive means for the shaft not being illustrated in the drawings.

A first drive pulley 24 is mounted upon the main drive shaft 23 at the outboard end thereof, as indicated in Figs. 2 and 3, and is connected by a belt 34 to a driven pulley 25 mounted upon a cam shaft 26; the cam shaft extends transversely of the sensing station at the lower rear end thereof. The cam shaft 26 is connected in mechanical driving relationship to a second cam shaft 27 by means of a pair of gears 28 and 29. A series of cams 30 mounted upon the first cam shaft 26 may be engaged by suitable cam follower devices 31; similarly, the several cams 32 mounted upon the second cam shaft 27 are engaged by suitable cam follower devices 33. The cams and cam followers 30—33 may be utilized in conventional manner in the control of certain of the business machine operations as described in the aforementioned Gruver application, Ser. No. 465,612, now Patent No. 2,853,356.

A second drive pulley 35 is affixed to the main drive shaft 23, being located just inboard of the drive pulley 24 as indicated in Figs. 2 and 3. The drive pulley 35 is connected to a pair of driven pulleys 36 and 37 by means of a suitable belt 38 as indicated in Figs. 1 and 2. The first driven pulley 36 is mounted upon a drive shaft 39 which is gear-connected to a pair of roller shafts 40 and 41. Similarly, the driven pulley 37 is affixed to a drive shaft 42 connected by suitable gearing to a pair of roller shafts 43 and 44. The gear connections have not been shown in detail in the drawings, but are essentially conventional in construction.

A pair of conveyor rollers 46 and 47 are mounted upon the shaft 40 for rotation therewith, the position of these rollers being best shown in Fig. 2. A similar pair of rollers 48 and 49 are affixed to the shaft 44 for rotation therewith. A conveyor roller 50 is affixed to the driven shaft 41 and a similar roller 51 is mounted upon the shaft 43 for rotation therewith. Similar conveyor rollers 52 and 53, which are also driven from the shafts 39 and 42 respectively, are mounted on the opposite side of the sensing station as indicated in Fig. 2.

Each of the conveyor rollers 46–53 extends up through a suitable aperture in the sensing platform 54 of the sensing station 20 in position to engage a record card supported upon the platform and to move the record card across the sensing platform in the direction indicated by the arrows A in the several figures. Preferably, the individual conveyor rollers are each engaged by one of a series of idler rollers 56 which are mounted above the sensing platform 54 and which maintain a positive engagement between the conveyor rollers 46–53 and the record cards. An extension 57 of the platform 54 serves to support the card magazine 21.

The card feed mechanism of the sensing station is best illustrated in Figs. 2, 3, and 7. This portion of the sensing station includes a pair of card feed fingers 58 and 59 which, as indicated in Fig. 2, extend up through suitable apertures 60 and 61 in the extension portion 57 of the sensing station platform, the apertures 60 and 61 being located immediately beneath the record instrument magazine 21. The feed fingers 58 and 59 are supported for longitudinal sliding motion upon two rods 62 and 63 respectively. As indicated in Fig. 3, the card feed finger 58 is pivotally connected to a bifurcated rocker arm 64, the arm 64 being affixed to a rock shaft 65. Similarly, the card feed finger 59 is pivotally connected to a bifurcated rocker arm 66, the other end of the arm 66 being affixed to the rock shaft 65. The rock shaft 65, in turn, is mechanically coupled to the main drive shaft 23 by means of a lever 67 which is pivotally connected to a connecting link 68 eccentrically linked to the drive shaft 23 as indicated by reference numeral 69 in Fig. 7.

The sensing station 20 also includes a conventional sensing apparatus comprising a lower pin box 70. The lower pin box 70 includes a lower guide plate 71 and an upper guide plate 72 which are utilized to support a plurality of sensing elements or contact members 73. The two guide plates 71 and 72 are mounted in fixed spaced relation to each other and the lower guide plate 71 is supported upon a pair of support members 75 and 76 as indicated in Figs. 4 and 5. The support member 75 is mounted for vertical movement with respect to the frame of the sensing station, being engaged by a pair of rollers 77 mounted upon suitable shafts 78 affixed to the frame member 79 of the sensing station, the roller 77 being engaged in suitable slots 80 in the support member. Similarly, the frame member 81 on the opposite side of the sensing station is employed to support a pair of suitable shafts 82 on which are mounted rollers 83 which engage in the apertures 84 in the second support member 76. The support member 75 is pivotally connected to a lever 86 which, in turn, is pivotally connected to a drive link 87. Similarly, the support member 76 is pivotally connected to a lever 88 which in turn is pivotally connected to a drive link 89. As indicated in Figs. 4 and 7, the drive link 89 is affixed to a bushing 90 journalled upon a fixed shaft 91. The bushing 90 is also affixed to a cam follower arm 92 which supports a cam follower roller 93 in engagement with a cam 94 affixed to the main drive shaft 23. In similar manner, the drive link 87 is secured to a bushing 95 journalled on the fixed shaft 91. Cam follower arm 96 is also affixed to the bushing 95 and supports a cam follower roller 97 in engagement with a cam 98 mounted upon the main drive shaft 23.

A further connecting link 100 is affixed to the bushing 90, the opposite end of the link being pivotally connected to a vertically extending lever 101. The lever 101, at its upper end, is employed to support a first gate or guide member 102 which extends upwardly through a suitable aperture in the sensing platform 54, the position of the guide member 102 being best indicated in Figs. 2 and 7. A second similar guide member 103 extends upwardly through the platform at the opposite side thereof, being supported upon a vertically extending member 104 shown in Fig. 4 and being connected to the bushing 95 by a connecting link 105. Further guide means for the sensing station are afforded by a suitable fixed guide member 106 located at the left-hand side of the sensing platform 54 as seen in Figs. 2 and 5.

The sensing station 20, as indicated in Figs. 1 and 3, also includes an upper pin box mechanism 110 which is essentially conventional in construction. In the illustrated arrangement, the upper pin box assembly comprises a plurality of individual sensing elements or pins 111 supported for vertical reciprocating movement with respect to the sensing platform 54 by means comprising a pair of mounting members 112 which are guided for vertical movement by the guide members 113. Operation of the upper pin box is accomplished by means comprising a pair of support members 114 which are pivotally connected to the members 112 as indicated at 115 in Fig. 1, the opposite ends of the support members 114 being pivotally connected to a pair of connecting links 116 affixed to a rock shaft 117 for rotation therewith. The rock shaft 117, in turn, is driven by a further connecting link 118, as illustrated in Fig. 6, the link 118 being pivotally connected to a tie rod 119 which in turn is pivotally connected to one arm 120 of a bell crank 121. The other arm 122 of the bell crank 121 supports a cam follower 123 which engages a cam 124 mounted upon the main drive shaft 23 of the sensing station for rotation therewith.

Certain of the figures also show some of the operating parts of the record card transport which receives the record instruments after they have been analyzed in the sensing station 20 and transports them to the remaining stations of the business machine for other operations, such as printing or other similar functions. Thus, a conveyor slide 130 is mounted beneath the forward or discharge end of the sensing platform 54 and extends upwardly through a suitable aperture 131 therein as indicated in Figs. 2, 5 and 7, being slidably mounted upon a rod 132. As shown in Figs. 5 and 7, the slide 130 is connected to a pivotally mounted link 134 which in turn is pivotally connected to a tie rod 135. The opposite end of the rod 135 is pivotally connected to one arm 136 of a bell crank 137. The bell crank 137 also includes two cam follower arms 138 and 139 which engage the cam surfaces of a conjugate cam 140 mounted upon a drive shaft 141. The drive shaft 141 is driven from the main drive shaft 23 or from the drive means therefor by suitable gearing or other drive linkage, the drive linkage not being shown in the drawings.

The sensing station 20, as thus far described, is essentially conventional in construction and operation, but has been shown in detail in order to afford a complete and comprehensive illustration of the general kind of sensing mechanism with which the invention is concerned. As indicated hereinabove, the sensing station is incorporated in and forms an integral and important part of a business machine such as a printing machine, an accounting machine, or the like. When the machine is placed in operation, the record instruments comprising the punched cards 22 are deposited in the mechanism 21. The drive mechanism (not shown) of the machine is then energized to drive the main drive shaft 23 in a cyclic manner; that is, the shaft 23 rotates through a complete revolution, is halted for an interval, and is then set in rotation again so that the machine may be actuated in accordance with a predetermined operating cycle.

During each revolution of the main drive shaft 23, the rock shaft 65 is rocked in a clockwise direction, as seen in Fig. 7, by means of the linkage comprising the eccentric 69, the connecting rod 68 and the lever 67. The clockwise movement of the rock shaft causes the two bifurcated rocker arms 64 and 66 to pivot in a clockwise direction, impelling the card feed fingers 58 and 59 in the direction indicated by arrow A. The card feed fingers engage the lowermost card 22 in the stack and impel that card along the sensing platform 54 from the initial position 150 to the sensing position 151 (Fig. 2) immediately above the lower pin box 70 and, consequently, immediately below the upper pin box assembly 110. One of the cards 22A is shown in sensing position in Fig. 1.

In the illustrated sensing station, it is necessary that movement of the card be arrested during the sensing operation. This is accomplished by the two gate guide members 102 and 103, which are raised during the initial part of the sensing cycle by means of the linkage connecting those gate members to the cams on the main drive shaft 23. The forward movement of the record card to the sensing position 151 is accomplished by the conveyor rollers 46, 47 and 50–53 in cooperation with the corresponding rollers 56.

Once the record card engages the gate members 102 and 103 it cannot continue its forward motion even though the conveyor rollers continue to be driven. Moreover, its lateral position with respect to the sensing platform 54 is accurately determined by the guide member 106 and by further guide means on the opposite side of the platform as will be described more fully hereinafter. While the record card is located in the position 151, the upper pin box 110 is actuated by means of the linkage illustrated in Fig. 6 and the sensing pins 111 are moved downwardly toward the record card. At the same time, the lower pin box 70 is moved upwardly by means of the above described linkage connecting it to the main drive shaft 23. As the two pin boxes approach each other, some of the sensing pins 111 encounter the record card and are arrested in their downward movement short of contact with the corresponding contact members 73. At each point where the card is provided with a code aperture, however, the pins 111 and 73 aligned with that aperture make contact with each other and complete an electrical circuit in the business machine in known manner, the combination of completed control circuits serving to indicate to the machine the nature of the information with which the card is encoded. Thereafter, the two pin boxes are returned to their normal or unactuated position as indicated in the drawings, the gates 102 and 103 are lowered, and the conveyor rollers 48–53 transfer the card to the third position indicated in Fig. 2 by phantom outline 153. Subsequently, the transport slide 130 is actuated through the drive linkage described hereinabove in connection with Figs. 2, 5 and 7 to impel the record card in the direction indicated by arrow B toward the remaining operation stations of the business machine.

The sequence of operational steps set forth immediately hereinabove represent the normal operation of the sensing station 20 and under ideal conditions continues uninterrupted throughout operation of the machine. In some instances, however, the analysis of the code information on the record cards effected by the sensing station 20 may indicate the presence of a card which should not be permitted to continue through the machine to control further operations. Thus, the sensing station may determine that a given card is defective or is not encoded with certain predetermined information which should be on each card to be utilized in a given run of the machine. When this occurs, the control circuits of the machine may be actuated in conventional manner by the sensing station to halt operation of the machine. At this point, the machine operator knows that a defective or otherwise undesirable card is present in the sensing station and that such card must be removed before operation of the machine is resumed. In conventional sensing stations, it would be necessary for the operator to advance the card from the sensing station onto the card transport and to remove the card at some subsequent point on the transport. This time consuming and wasteful procedure, however, is eliminated entirely in the sensing station 20 by the provision of a means for removing the card directly from the sensing station without requiring further operation of the machine, thereby enabling the operator to get the machine back in operation as quickly as possible.

The card ejector of the sensing station 20 comprises an ejector slide 160 which is illustrated in Figs. 8–10 and which is also shown in Figs. 1–3, 5, and 7 in its operative position in relation to the remainder of the sensing station. The ejector slide 160 comprises a shank portion 161 which, as indicated in Fig. 10, is essentially of inverted T-shaped cross sectional configuration. This shank portion 161 of the slide is fitted into a corresponding slot 162 in the sensing platform 54, the slot 162 also being of inverted T-shaped configuration. Moreover, the slot 162 is made to conform as closely as possible to the dimensions of the shank portion 161 of ejector slide 160 in order that the upper surface 163 of the ejector slide shall be co-planar with the upper surface of the sensing platform 54 as best indicated in Fig. 1. With the upper surface of the ejector slide co-planar with the upper surface of the sensing platform, the slide cannot interfere with the forward movement of the record cards across the sensing platform and therefore does not jam the sensing station during normal operation.

The ejector slide 160 is also equipped with a guide lug 165 which extends upwardly from one end of the slide as indicated in Fig. 9. When the slide is disposed in its normal operation position, as illustrated in Fig. 2, the guide lug 165 is located beyond the edge of the guide member 106 and consequently does not interfere in any way with the normal movement of record cards through the sensing station. The ejector slide is also provided with two additional guide members or lugs 166 and 167 which are located at the opposite end of the slide from the guide lug 165. The guide members 166 and 167 define the right-hand edge of the card sensing position 151, being aligned opposite the fixed guide member 106 and cooperating with that guide member and the two gate members 102 and 103 to maintain the record cards in accurate alignment on the sensing platform during the sensing operation. The guide members 166 and 167 form an integral part of a handle member 168 on the ejector slide 160. In addition, the handle member 168 is provided with a pair of depending guide pins 169 which engage the edge of the platform 54 to afford a means for aligning the ejector slide in the sensing station, as indicated in Fig. 2.

During normal operation of the machine, the ejector slide 160 serves only as a part of the guide means for maintaining the business instruments 22 in the desired sensing position 151 on the platform 54 during the sensing operation. When the business machine is interrupted in its operation, however, and it is desired to remove a defective or otherwise undesirable card from the sensing station, it is only necessary to move the ejector slide longitudinally in the direction indicated in Figs. 2 and 8 by arrow C. As the ejector slide is moved longitudinally, the lug 165 engages the card in the sensing position 151 and impels it outwardly of the sensing station in a direction transverse to the normal direction of card movement as indicated by arrows A. When the ejector slide is pulled outwardly to its full extent, the card is simply lifted therefrom, the ejector is pushed back into the sensing station, and the machine is again ready for normal operation.

The construction of the ejector slide 160 effectively minimizes any possibility that the card will become jammed in the sensing station during normal operation thereof or in the course of removing a card from the sensing station. As indicated hereinabove, the positioning of the upper surface 163 of the slide in co-planar relationship with the upper surface of sensing platform 54 and the utilization of the slide as a part of the guide means for the sensing station prevents jamming of the cards in the ejector mechanism during normal operation. Because the card is normally captured under the lip afforded by the guide lugs 166 and 167, it does not bend or otherwise become jammed during removal. The two pins 169 afford a convenient and accurate means for realigning the ejector slide in the sensing station upon completion of the ejection operation; in normal operation, there is virtually no danger that the operator can jam the machine by inaccurate or careless operation of the ejector.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a business machine controlled by business instruments encoded with business information in accordance with a predetermined data code, a sensing station comprising: a sensing platform; means for sequentially feeding business instruments across the sensing platform; guide means for maintaining the business instruments in a predetermined sensing position on the platform; a plurality of sensing elements for analyzing each business instrument when in sensing position; means for removing said instruments from said sensing station, in a given direction, in the course of normal operation of the machine; and ejector means for removing undesired cards from the sensing station comprising a longitudinally movable ejector slide extending across the platform in substantially co-planar relation therewith, transversely of the direction of business instrument removal, and a guide lug extending upwardly from one end of said slide above the level of said platform, for removing undesired cards from the sensing station upon longitudinal movement of said slide.

2. In a business machine controlled by business instruments encoded with business information in accordance with a predetermined data code, a sensing station comprising: a sensing platform; means for sequentially feeding business instruments, in a given direction, across the sensing platform; guide means for maintaining the business instruments in a predetermined sensing position on the platform; a plurality of sensing elements for analyzing each business instrument when in sensing position; and ejector means, for removing undesired cards from the sensing station, said ejector means comprising a longitudinally movable ejector slide extending across the platform transversely of the direction of business instrument feeding and a pair of guide lugs extending from opposite ends of said slide, at least one of said guide lugs cooperating with said guide means to maintain the business instruments in sensing position.

3. In a business machine controlled by business instruments encoded with business information in accordance with a predetermined data code, a sensing station comprising: a sensing platform; means for sequentially feeding business instruments, in a given direction, onto the sensing platform; a pair of fixed guide members, disposed on two sides of said sensing platform, for maintaining the business instruments in a predetermined sensing position on the platform; a plurality of sensing elements for analyzing each business instrument when in sensing position; and ejector means for removing undesired cards from the sensing station, said ejector means comprising a longitudinally movable ejector slide extending across the platform transversely of the direction of business instrument feeding in substantially co-planar relation with the platform, a first guide lug extending upwardly of one end of the slide, and a second guide lug extending upwardly of the other end of the slide along a third side of the sensing plaform.

4. In a business machine controlled by business instruments encoded with business information in accordance with a predetermined data code, a sensing station comprising: a sensing platform having a slot of inverted T-shaped configuration extending thereacross; means for sequentially feeding business instruments onto the sensing platform transversely of the slot; guide means for maintaining the business instruments in a predetermined sensing position on the platform over said slot; a plurality of sensing elements for analyzing each business instrument when in sensing position; and ejector means, comprising a longitudinally movable ejector slide of inverted T-shaped cross-sectional configuration extending across the platform through said slot and being longitudinally movable therethrough, for removing undesired cards from the sensing station.

References Cited in the file of this patent

UNITED STATES PATENTS 2,411,645     Whetstone     Nov. 26, 1946